(No Model.)
N. N. FROST.
AUTOMATIC WATER EJECTOR FOR VESSELS.
No. 422,391. Patented Mar. 4, 1890.
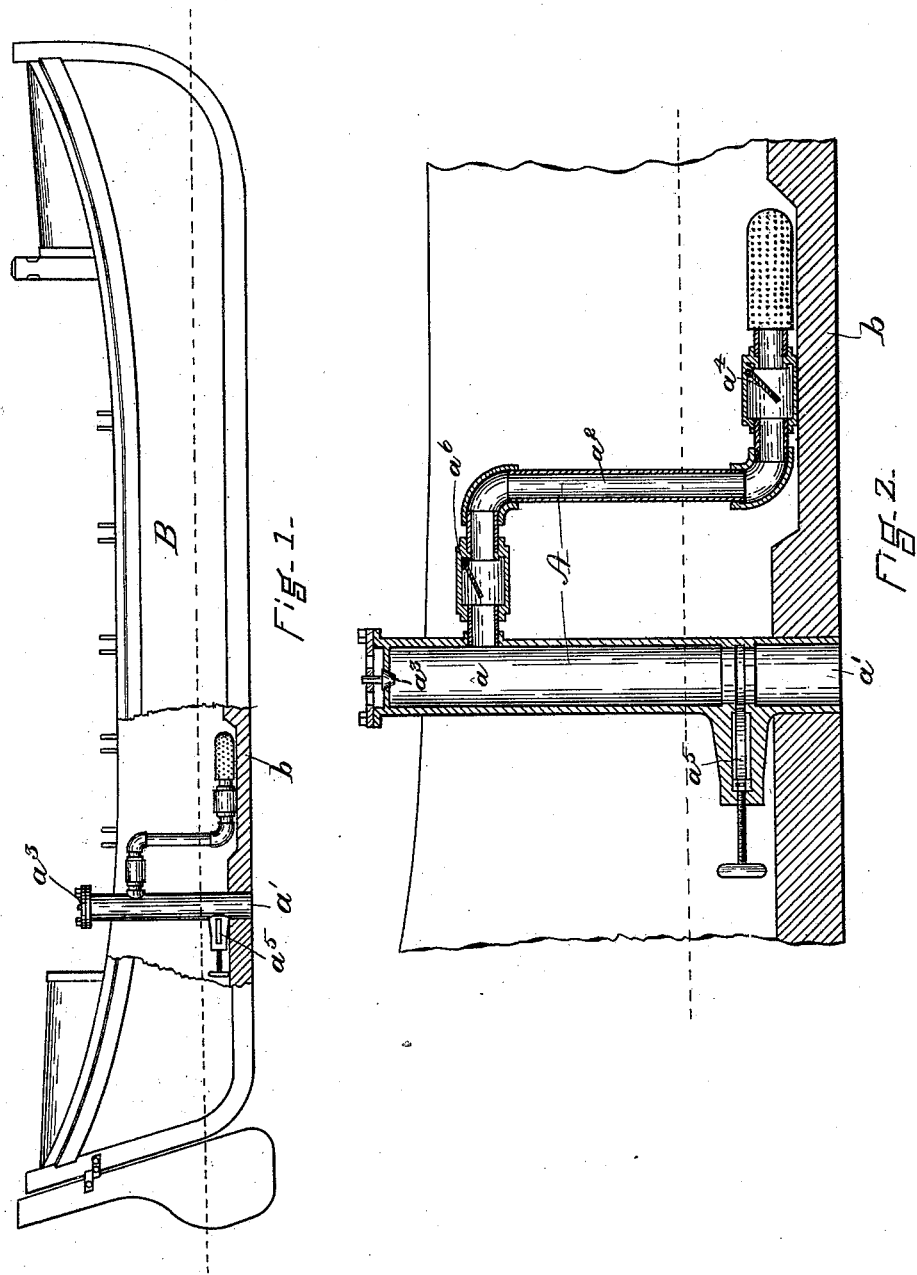
WITNESSES
Edward S. Beach
John R. Snow
INVENTOR
Nathaniel N. Frost,
by J. E. Maynadier
Atty

UNITED STATES PATENT OFFICE.

NATHANIEL N. FROST, OF MALDEN, ASSIGNOR OF TWO-THIRDS TO ABBOTT COFFIN, OF GLOUCESTER, AND EDWARD S. MERCHANT, OF WEST NEWTON, MASSACHUSETTS.

AUTOMATIC WATER-EJECTOR FOR VESSELS.

SPECIFICATION forming part of Letters Patent No. 422,391, dated March 4, 1890.

Application filed June 4, 1887. Serial No. 240,212. (No model.)

*To all whom it may concern:*

Be it known that I, NATHANIEL N. FROST, of Malden, in the county of Middlesex and State of Massachusetts, have invented a new and useful Automatic Ejector, of which the following is a specification, reference being had to the accompanying drawings, in which—

Figure 1 shows my ejector applied to a life-boat, and Fig. 2 is a sectional view of a portion of a life-boat and the ejector in place.

My invention consists in a chamber having an opening for the inflow and outflow of water, a valve which opens outwardly for the escape of air when water flows into the chamber, and a valve which, when water flows out of the chamber, opens inwardly to admit the inflow of water, air, &c., through its opening.

The special objects of my invention are the automatic ejection of water or foul air from ships, steamers, boats, &c., and of sewage from cesspools which are near bodies of tidal water, where waves run high.

My ejector is of very great value and importance as an attachment for life-boats, which are often partially filled with water in launching, and from which there is seldom time for bailing out the water.

In the drawings, in which my ejector is shown applied to a life-boat, chamber A is of a form specially suited for life-boats and smaller craft, and is made of pipe, which is secured to boat B, with its vertical section $a$ open at $a'$ for the inflow and outflow of water near the keel $b$, and with a curved section $a^2$ leading to the bottom of the well of the boat. Section $a$ of chamber A is provided at its top with an outwardly-opening valve $a^3$, and section $a'$ of chamber A is provided with a valve $a^4$, which opens inwardly. When the boat falls, water rises in section $a$ of chamber A and forces the air in section $a$ against valve $a^3$, whereby valve $a^3$ is raised from its seat and air escapes through the valve-opening. As the boat rises, water in section $a$ falls, valve $a^3$ returns to its seat, and a partial vacuum is created in section $a$, and then the water (or air) at valve $a^4$ under atmospheric pressure forces the inwardly-opening valve $a^4$ from its seat and flows into chamber A, whence it escapes. Valve $a^4$ immediately falls to its seat, and by the next rising of the boat a partial vacuum is again formed in section $a$ of chamber A, and another rush of water (or air) into chamber A takes place.

In practice I provide chamber A with a valve $a^5$, by means of which the ejector is rendered inoperative whenever desired, and I usually cover the lower end of section $a^2$ with a strainer and place in section $a^2$ an intermediate valve $a^6$, corresponding to valve $a^4$. This valve is desirable, but not necessary. Valves $a^3$ $a^4$ are so mounted that they take their seats by gravity. Care should be taken, however, to make the valves fit their seats closely, so that when the air in the section $a$ is driven upwardly it may not escape through valve-opening of valve $a^4$, and when the water falls in the chamber air may not rush in at valve $a^3$.

It will be readily seen that my ejector is available for automatically ejecting water from holds of ships and also for ventilating ships. When used for the latter purpose, the chamber may be a simple stand-pipe, if desired.

My ejector is also available for removing sewage from cesspools which are located near tide-waters and waters where waves run high. When used for this purpose, chamber A is so placed that the tidal waters or waves flow into and out of section $a$ of chamber A, thus forming the partial vacuum in the chamber and causing a rush of sewage from the cesspool to which the section, say $a^2$ of chamber A, leads.

What I claim as my invention is—

A chamber A, having an opening $a'$ near its lower end for the inflow and outflow of water, an outwardly-opening valve $a^3$ above the opening $a'$, and a valve $a^4$, opening inwardly, said valve $a^4$ being in the lower part of chamber A, all substantially as and for the purpose set forth.

NATHANIEL N. FROST.

Witnesses:
 EDWARD S. BEACH,
 JOHN R. SNOW.